US008645729B2

(12) United States Patent
Simmons et al.

(10) Patent No.: US 8,645,729 B2
(45) Date of Patent: Feb. 4, 2014

(54) EXTERNAL DEVICE POWER CONTROL DURING LOW POWER SLEEP MODE WITHOUT CENTRAL PROCESSING UNIT INTERVENTION

(75) Inventors: Michael Simmons, Chandler, AZ (US); Michael Catherwood, Georgetown, TX (US)

(73) Assignee: Microchip Technology Incorporated, Chandler, AZ (US)

( * ) Notice: Subject to any disclaimer, the term of this patent is extended or adjusted under 35 U.S.C. 154(b) by 392 days.

(21) Appl. No.: 12/818,547

(22) Filed: Jun. 18, 2010

(65) Prior Publication Data

US 2011/0179297 A1 Jul. 21, 2011

Related U.S. Application Data

(60) Provisional application No. 61/296,947, filed on Jan. 21, 2010.

(51) Int. Cl.
*G06F 1/32* (2006.01)
(52) U.S. Cl.
USPC .............................. 713/310; 713/300; 713/320
(58) Field of Classification Search
USPC .......................... 713/300, 310, 320, 323, 324
See application file for complete search history.

(56) References Cited

U.S. PATENT DOCUMENTS

| 6,047,380 | A | * | 4/2000 | Nolan et al. | 713/324 |
| 6,622,178 | B1 | * | 9/2003 | Burke et al. | 710/15 |
| 2001/0027530 | A1 | * | 10/2001 | Yen et al. | 713/300 |
| 2005/0262367 | A1 | | 11/2005 | Shih | 713/323 |
| 2007/0260905 | A1 | | 11/2007 | Marsden | 713/323 |
| 2009/0077404 | A1 | | 3/2009 | Herring et al. | 713/323 |

FOREIGN PATENT DOCUMENTS

DE  102004028070 B3  12/2005 ............... G06F 1/32

OTHER PUBLICATIONS

International PCT Search Report and Written Opinion, PCT/US2011/021689, 10 pages, Mailed Apr. 13, 2011.

* cited by examiner

*Primary Examiner* — Paul Yanchus, III
(74) *Attorney, Agent, or Firm* — King & Spalding L.L.P.

(57) ABSTRACT

An integrated circuit device controls power up of an external device used for sensing a process variable independently of whether the integrated circuit device is in a low power sleep mode. Once the external device becomes operational the integrated device, even when still in the low power sleep mode, samples the process variable status of the external device. Low power timing circuits operational during the low power sleep mode control the power up of the external device and sampling of the process variable status thereof. After the sample of the process variable status is taken, the integrated circuit device may be brought out of the low power sleep mode to an operational mode when appropriate as determined from the sampled process variable status.

31 Claims, 4 Drawing Sheets

(Prior Technology)**

EXTERNAL DEVICE POWER CONTROL DURING LOW POWER SLEEP MODE WITHOUT CENTRAL PROCESSING UNIT INTERVENTION

RELATED PATENT APPLICATION

This application claims priority to commonly owned U.S. Provisional Patent Application Ser. No. 61/296,947; filed Jan. 21, 2010; entitled "External Device Power Control During Low Power Sleep Mode Without Central Processing Unit Intervention," by Michael Simmons and Michael Catherwood, and is hereby incorporated by reference herein for all purposes.

TECHNICAL FIELD

The present disclosure relates to integrated circuit devices, and more particularly, to power savings of integrated circuit devices when in low power sleep modes.

BACKGROUND

In current low power modes (Sleep, Deep Sleep, etc.), there are various ways of waking up an integrated circuit device from a low power mode. One such way is through the use an external "wake" signal (often a re-purposed interrupt input). However, this requires that the source of the wake signal be alive while the integrated circuit device is in its low power mode, resulting in an overall system power consumption that is larger than required.

SUMMARY

The aforementioned problems are solved, and other and further benefits are achieved by periodically waking up an external device(s) without the intervention of main logic circuits, e.g., processor, that may be in a low power, deep sleep mode. This feature may be accomplished with for example, but not limited to, existing low power mode timers, e.g., real time clock and calendar (RTCC), watchdog timer (WDT), Deep Sleep WDT, general purpose timer, etc.) using a simplified 2-channel pulse width modulation (PWM) like function. As such a periodic power-up (wake-up) can be provided to an external device, e.g., temperature sensor, wait for it to start up and become stable, sample its "wake" output signal, and then power it back down, all without ever requiring the main circuit logic in a digital device to leave a low power mode.

According to a specific example embodiment of this disclosure, an integrated circuit digital device determines control and status determination of an external device independently of when the digital device is in a low power sleep mode, comprises: a digital processor having a wake-up input, the wake-up input wakes up the digital processor from a sleep mode to an operational mode when at a first logic level is applied thereto and does not wake up the digital processor when a second logic level is applied thereto; a power-up timer coupled to an external device, wherein the power-up timer causes the external device to go into an operational mode during a first time period; a sample timer, wherein the sample timer causes an output from the external device to be applied to the wake-up input of the processor during a second time period, wherein during the second time period if the output of the external device is at the first logic level then the processor wakes up to the operational mode; and if the output of the external device is at the second logic level then the processor remains in the sleep mode.

According to another specific example embodiment of this disclosure, an integrated circuit mixed signal device determines control and status of an external device independently of when the mixed signal device is in a low power sleep mode, comprises: a digital processor having a wake-up input, the wake-up input wakes up the digital processor from a sleep mode to an operational mode when at a first logic level is applied thereto and does not wake up the digital processor when a second logic level is applied thereto; a comparator having a first input coupled to an analog output of an external device; a voltage reference having a reference voltage output connected to a second input of the comparator; a power-up timer coupled to the external device, wherein the power-up timer causes the external device to go into an operational mode during a first time period; a sample timer, wherein the sample timer causes an output from the comparator to be applied to the wake-up input of the processor during a second time period, wherein during the second time period if the analog output of the external device is greater than the reference voltage output then the processor wakes up to the operational mode; and if the analog output of the external device is equal to or less than the reference voltage output then the processor remains in the sleep mode.

According to yet another specific example embodiment of this disclosure, a method of conserving power and monitoring status of an external device without having to wake up digital circuits of an integrated circuit device from a low power sleep mode, comprises the steps of: applying power to an external device during a first time period from a power-up timer; comparing an output from the external device with a reference value during a second time period from a sample timer, the second time period beginning after the first time period has started; wherein during the second time period if the output of the external device is greater than the reference value then digital circuits of an integrated circuit device wake up to an operational mode; and if the output of the external device is equal to or less than the reference value then the digital circuits of an integrated circuit remain in a sleep mode.

BRIEF DESCRIPTION OF THE DRAWINGS

A more complete understanding of the present disclosure thereof may be acquired by referring to the following description taken in conjunction with the accompanying drawings wherein.

Figure 1:
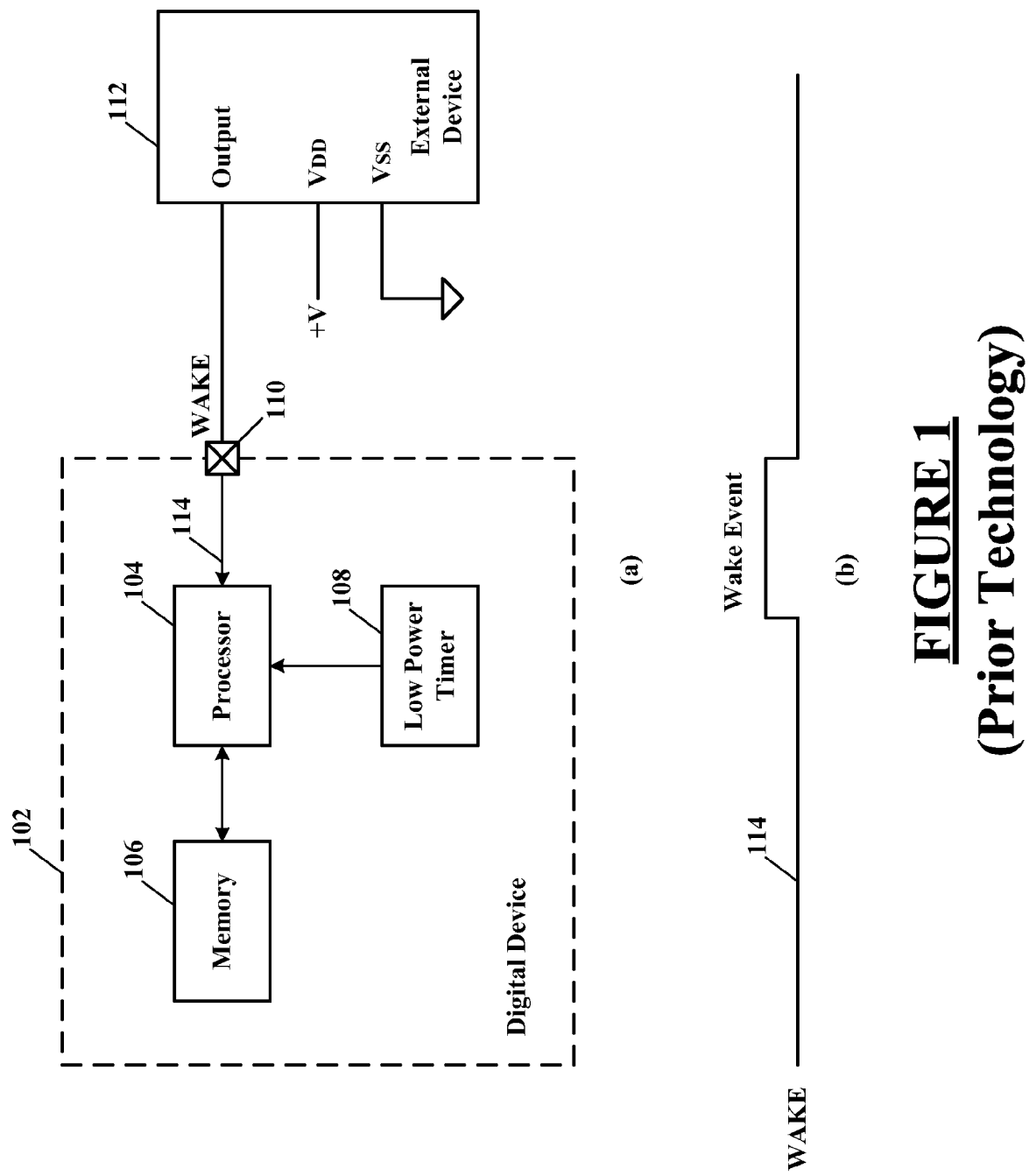
FIG. 1 illustrates a schematic block diagram of a prior technology digital device having a sleep mode and an external device coupled to and adapted for waking up the digital device, and a timing diagram of the external device operation.

While the present disclosure is susceptible to various modifications and alternative forms, specific example embodiments thereof have been shown in the drawings and are herein described in detail. It should be understood, however, that the description herein of specific example embodiments is not intended to limit the disclosure to the particular forms disclosed herein, but on the contrary, this disclosure is to cover all modifications and equivalents as defined by the appended claims.

DETAILED DESCRIPTION

Referring now to the drawings, the details of a example embodiment is schematically illustrated. Like elements in the drawings will be represented by like numbers, and similar elements will be represented by like numbers with a different lower case letter suffix.

Referring to FIG. 1, depicted is a schematic block diagram of a prior technology digital device having a sleep mode and an external device coupled to and adapted for waking up the digital device, and a timing diagram of the external device operation. A digital device 102 comprises a processor 104, a memory 106 coupled to the processor 104, and a low power timer 108, e.g., watchdog timer (WDT), real time clock and calendar (RTCC), etc. An external device 112 is coupled to the digital device 102 through an external input node 110, on an integrated circuit package (not shown).

The digital device 102 may be returned to an operational mode from a sleep mode by the low power timer 108 and/or a logic level change at the input node 110 from the external device 112. Either way, the digital device 102 will go back to the higher power usage operational mode. When the low power timer 108 is used to wake up the processor 104 and other necessary logic (e.g., memory 106), the processor 104 will sample the logic state of the node 110 to see if an event has been detected or occurred from the external device output logic state, e.g., temperature, pressure, moisture, pH, current, voltage, etc., sensor. Alternately, the processor 104, et al., may remain in a low power sleep mode until directly awoken by a logic state change at the node 110 from the output of the external device 112, as shown in the timing diagram (b) of FIG. 1.

However, using either way of waking up the processor 104 still requires that the external device 112 be kept continuously in an operational power consuming state. Some external devices 112 that may be used as sensors need only indicate monitored data and/or status periodically, e.g., once a minute or longer, etc. Therefore, maintaining operational status of the external device 112 continuously is most wasteful of power consumption. In battery powered applications, power consumption is critical.

Figure 2:
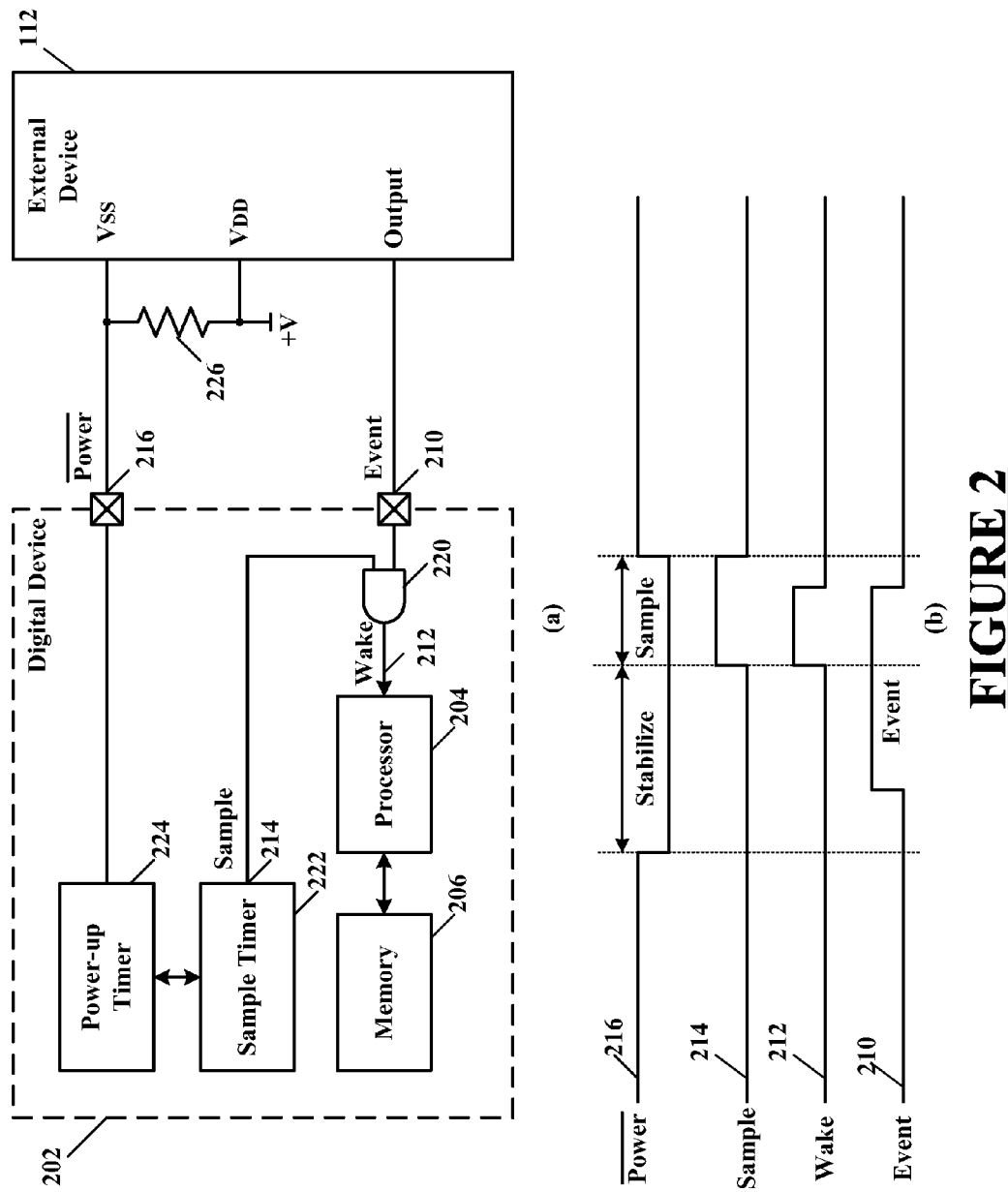
FIG. 2 illustrates a schematic block diagram of an integrated circuit digital device having a sleep mode, power-up and sample timers, and an external device whose operational on-time and event monitoring are controlled up the digital device, and a timing diagram of the operation thereof, according to a specific example embodiment of this disclosure.

Referring to FIG. 2, depicted is a schematic block diagram of an integrated circuit digital device having a sleep mode, power-up and sample timers, and an external device whose operational on-time and event monitoring are controlled up the digital device, and a timing diagram of the operation thereof, according to a specific example embodiment of this disclosure. A better way of conserving power with the external device 112 is to put it into a sleep mode or turn off operation of it completely, e.g., remove power therefrom, then only periodically activate the external device 112 when appropriate, and thereafter determine if an event monitored by the external device 112 has occurred. This very way is accomplished by the digital device 202 shown in FIG. 2.

The digital device 202 comprises a digital processor 204, a memory 206 coupled to the digital processor 204, a power-up timer 224, a sample timer 214, and an AND gate 220. Operationally, the power-up timer 224 will activate (turn on) the external device 112 by pulling the node 216 to a logic low (Vss) so that power is applied to the external device 112. Equally effective would be to apply power (VDD) directly from the node 216 to the VDD node of the external device 112.

Once the external device 112 has been powered up, it will do whatever it is intended to do, e.g., measure a process variable: temperature, pressure, vibration, etc. Then a sample of the output state of the external device 112 may be taken with the sample timer 214 once the external device 112 has become fully operational (e.g., after stabilizing, self calibrating, etc.). When this sample is taken, if the output of the external device 112 requires that the digital processor 204 be brought back to an operational mode, then a wake-up signal 212 from the AND gate 220 will be applied to the processor wake-up input, e.g., an interrupt input. The power-up timer 224, the sample timer 214 and the AND gate 220 may operate independently from any other circuits of the digital device 202 that are in the sleep mode. In addition, the power-up timer 224, the sample timer 214 and the AND gate 220 may be ultra-low power circuits adapted to operate with a minimum amount of power. The digital device 202 may be a microcontroller, a microprocessor, a digital signal processor, an application specific integrated circuit (ASIC), a programmable logic or gate array, etc.

The timing diagram (b) shown in FIG. 2 depicts the aforementioned sequence of events used for both conserving power of the external device 112 and causing a wake-up of the digital device 202 when appropriate. Power 216 is applied to the external device 112. Then if an event 210 occurs during the time of the sample 214, a wake-up signal 212 is applied to an input of the digital processor 204, and the event so detected is processed according to the software/firmware program in the memory 206.

It is contemplated and within the scope of this disclosure that the sample timer 214 may contemporaneously go active as the power 216 to applied to the external device 112. If there is no settling or stabilization time required by the external device 112, e.g., a dry contact switch (limit, pressure, etc.) then delay of the sample timer 214 may not be necessary. Also, there may be an integration or multiple samples taken by the processor 204 such that delayed assertion of the sample timer 214 after initial activation of the external device 112 is not necessary.

Figure 3:
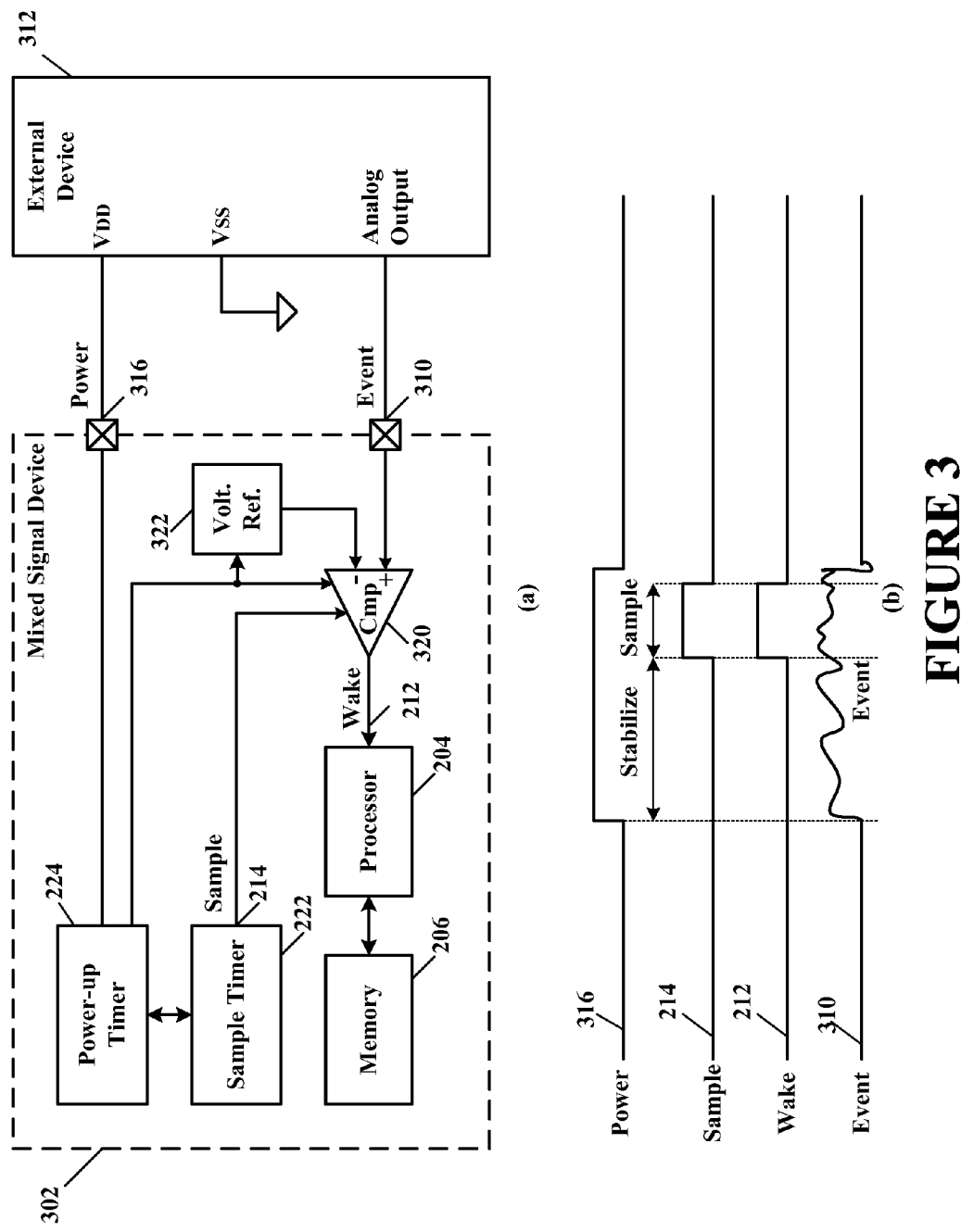
FIG. 3 illustrates a schematic block diagram of a integrated circuit mixed signal device having a sleep mode, power-up and sample timers, and an external device whose operational on-time and event monitoring are controlled up the mixed signal device, and a timing diagram of the operation thereof, according to another specific example embodiment of this disclosure.

Referring to FIG. 3, depicted is a schematic block diagram of an integrated circuit mixed signal device having a sleep mode, power-up and sample timers, and an external device whose operational on-time and event monitoring are controlled up the mixed signal device, and a timing diagram of the operation thereof, according to another specific example embodiment of this disclosure. A better way of conserving power with the external device 312 is to put it into a sleep mode or turn off operation of it completely, e.g., remove power therefrom, then only periodically activate the external device 312 when appropriate, and thereafter determine if an event monitored by the external device 312 has occurred. This very way is accomplished by the mixed signal device 302 shown in FIG. 3.

The mixed signal device 302 comprises a digital processor 204, a memory 206 coupled to the digital processor 204, a power-up control timer 224, a sample timer 214, a comparator 320 and a voltage reference 322. Operationally, the power-up timer 224 will activate (turn on) the external device 312 by pulling the node 216 to a logic low (Vss) so that power is applied to the external device 312. Equally effective would be to apply power (V$_{DD}$) directly from the node 216 to the Vdd node of the external device 312. Optionally, the power-up timer 224 may apply operating voltage to the comparator 320 and/or the voltage reference 322 for a further savings in power usage. The analog output of the external device 312 may have any number of analog values representative of what is being measured. The comparator 320 will compare the analog value (e.g., voltage) from the external device 312 to a voltage from the voltage reference 322. The reference voltage from the voltage reference 322 may be programmable (not shown) through the digital processor 204.

Once the external device 312 has been powered up, it will do whatever it is intended to do, e.g., measure a process variable: temperature, pressure, vibration, etc. Then a sample of the analog output of the external device 312 may be compared to the reference voltage from the voltage reference 322 with the comparator 320. An output of the comparator 320 is then enabled by the sample timer 214 once the external device 312 has become fully operational (e.g., after stabilizing, self calibrating, etc.). When this sample is taken, if the sampled analog value from the output of the external device 312 is greater than the reference voltage from the voltage reference 322, then the digital processor 204 may be brought back to an operational mode. A wake-up signal 212 from the comparator 320 will be applied to the processor wake-up input, e.g., an interrupt input. The power-up timer 224 and the sample timer 214 may operate independently from any other circuits of the mixed signal device 302 that are in the sleep mode. In addition, the power-up timer 224, the sample timer 214, the voltage reference 322 and/or the comparator 320 may be ultra-low power circuits adapted to operate with a minimum amount of power.

The mixed signal device 302 may be a microcontroller, a microprocessor, a digital signal processor, an application specific integrated circuit (ASIC), a programmable logic or gate array, a digital signal processor (DSP), etc., having both digital and analog circuits.

The timing diagram (b) shown in FIG. 3 depicts the aforementioned sequence of events used for both conserving power of the external device and causing a wake-up of the digital device when appropriate. Power 216 is first applied to the external device 312. Then an event 210 may occur at the output of the external device 312 during a time of the sample 214. If an event 210 occurs during the time of the sample 214, then a wake-up signal 212 is applied to an input of the digital processor 204 and the event so detected is processed according to the software/firmware program in the memory 206.

It is contemplated and within the scope of this disclosure that the sample timer 214 may contemporaneously go active as the power 316 to applied to the external device 312. For example, integration or multiple samples taken by the processor 204 would not require delayed assertion of the sample timer 214 after activation of the external device 312.

Figure 4:
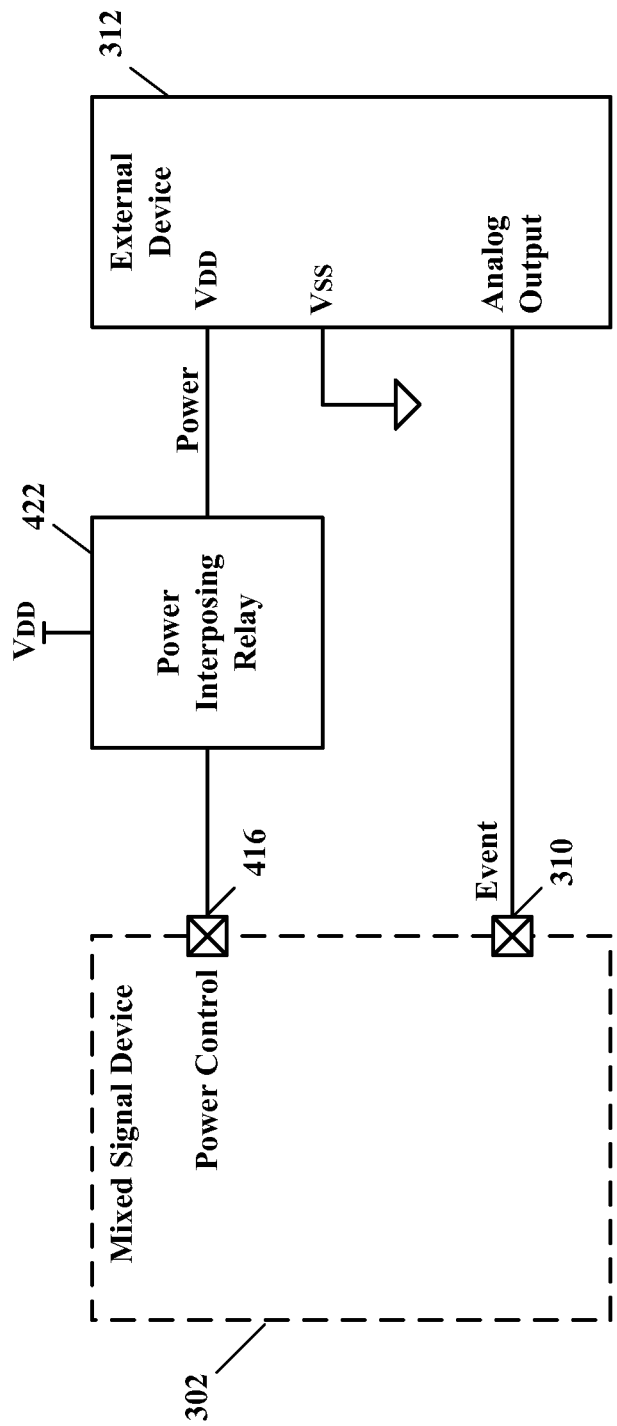
FIG. 4 illustrates a schematic block diagram of the circuits of FIGS. 2 and 3 having a power interposing relay controlled by the integrated circuit device and supplying power to the external device, according to the specific example embodiments of this disclosure.

Referring to FIG. 4, depicted is a schematic block diagram of the circuits of FIGS. 2 and 3 having a power interposing relay controlled by the integrated circuit device and supplying power to the external device, according to the specific example embodiments of this disclosure. When the external device 312 requires a power draw that exceeds the power handling capabilities of the device 302 (202) then a power interposing relay 422 may be used to supply power, V$_{DD}$, to the external device 312. The power interposing relay 422 may be an electromechanical or electronic switch, e.g., power transistor.

While embodiments of this disclosure have been depicted, described, and are defined by reference to example embodiments of the disclosure, such references do not imply a limitation on the disclosure, and no such limitation is to be inferred. The subject matter disclosed is capable of considerable modification, alteration, and equivalents in form and function, as will occur to those ordinarily skilled in the pertinent art and having the benefit of this disclosure. The depicted and described embodiments of this disclosure are examples only, and are not exhaustive of the scope of the disclosure.

What is claimed is:

1. An arrangement comprising
a microcontroller;
an external device connected with the microcontroller, wherein the microcontroller is operable to determine control and status of the external device independently of when the microcontroller is in a low power sleep mode,
wherein the external device has external connections only consisting of a power supply input and a single output line, and
wherein the microcontroller comprises:
a digital processor having a wake-up input, the wake-up input wakes up the digital processor from a sleep mode to an operational mode when a first logic level is applied thereto and does not wake up the digital processor when a second logic level is applied thereto;
a power-up timer coupled with a first external pin of the microcontroller, wherein the power-up timer provides an external device power up signal at the first external pin coupled with the power supply input of the external device during a first time period;
a sample timer, wherein the sample timer causes an external device output signal from the single output line received at a second external pin to be applied to the wake-up input of the processor during a second time period, wherein the second time period starts after the first time period has started and wherein during the second time period, the external device output signal defines whether the processor wakes up to the operational mode or remains in the sleep mode.

2. The arrangement according to claim 1, wherein the first logic level is a logic high and the second logic level is a logic low.

3. The arrangement according to claim 1, wherein the first logic level is a logic low and the second logic level is a logic high.

4. The arrangement according to claim 1, wherein the external device output signal received at the second external pin and an output from the sample timer are logically ANDed and then applied to the wake-up input of the digital processor.

5. The arrangement according to claim 1, wherein the power-up timer is selected from the group consisting of a general purpose timer, a real time clock and calendar (RTCC), a watchdog timer (WDT), and a deep sleep WDT.

6. The arrangement according to claim 1, wherein the sample timer is selected from the group consisting of a real time clock and calendar (RTCC), a watchdog timer (WDT), and a deep sleep WDT.

7. The arrangement according to claim 1, wherein the external device output signal may be an analog or a digital signal generated by an external device selected from the group consisting of a temperature sensor, a pressure sensor, a moisture sensor, a pH sensor, a current sensor, and a voltage sensor.

8. The arrangement according to claim 1, wherein the single output line of the external device provides fo an analog signal representing an an analog sensor value and the single output line is connected to an analog input port of the microcontroller.

9. The arrangement according to claim 1, further comprising an interposing power relay controlled by the power-up timer and supplying power to the external device.

10. The arrangement according to claim 9, wherein the interposing power relay is a power transistor.

11. An arrangement comprising:
an integrated circuit mixed signal device coupled with an external device, wherein the integrated mixed signal device is operable to determine control and status of the external device independently of when the mixed signal device is in a low power sleep mode,
wherein the external device has external connections only consisting of a power supply input and a single output line, and
wherein the integrated circuit digital device comprises:
a digital processor having a wake-up input, the wake-up input wakes up the digital processor from a sleep mode to an operational mode when at a first logic level is applied thereto and does not wake up the digital processor when a second logic level is applied thereto;
a comparator having a first input coupled to a first external pin, wherein the first external pin is connected with the single output line of the external device;
a voltage reference having a reference voltage output connected to a second input of the comparator;
a power-up timer coupled with a second external pin, wherein the power-up timer provides an external device power up signal at the first external pin during a first time period to the power supply input of the external device;
a sample timer, wherein the sample timer causes an output from the comparator to be applied to the wake-up input of the processor during a second time period, wherein the second time period starts after the first time period has started;
wherein during the second time period
if the analog output signal received at the first external pin is greater than the reference voltage output then the processor wakes up to the operational mode; and
if the analog output signal received at the first external pin is equal to or less than the reference voltage output then the processor remains in the sleep mode.

12. The arrangement according to claim 11, wherein the comparator is only operational during the first time period.

13. The arrangement according to claim 11, wherein the voltage reference is only operational during the first time period.

14. The arrangement according to claim 11, wherein the comparator is only operational during the second time period.

15. The arrangement according to claim 13, wherein the voltage reference is only operational during the second time period.

16. The arrangement according to claim 11, wherein the power-up timer is selected from the group consisting of a general purpose timer, a real time clock and calendar (RTCC), a watchdog timer (WDT), and a deep sleep WDT.

17. The arrangement according to claim 11, wherein the sample timer is selected from the group consisting of a general purpose timer, a real time clock and calendar (RTCC), a watchdog timer (WDT), and a deep sleep WDT.

18. The arrangement according to claim 11, wherein the external device output signal is selected from the group consisting of a temperature sensor signal, a pressure sensor signal, a moisture sensor signal, a pH sensor signal, a current sensor signal, and a voltage sensor signal.

19. The arrangement according to claim 11, wherein the mixed signal device is selected from the group consisting of a microcontroller, a microprocessor, a digital signal processor (DSP), an application specific integrated circuit (ASIC), a programmable logic array (PLA), and a programmable gate array (PGA).

20. The arrangement according to claim 11, wherein the voltage reference has a programmable reference voltage.

21. The arrangement further comprising an interposing power relay controlled by the power-up timer and supplying power to the external device.

22. The arrangement according to claim 21, wherein the interposing power relay is a power transistor.

23. A method of conserving power and monitoring status of an external device without having to wake up digital circuits of an integrated circuit device from a low power sleep mode, said method comprising the steps of:
coupling the external device with the integrated circuit device only via a power supply connection and a single signal line;
setting a digital processor of the integrated circuit device into a sleep mode;
applying power to an external device through said power, supply connection during a first time period by means of a power-up timer of the integrated circuit device;
applying an output signal from the external device through said single signal line with a reference value during a second time period defined by a sample timer of the integrated circuit device to a wake-up input of the digital processor, wherein the second time period starts after the first time period has started,
wherein the output signal defines whether the processor wakes up into an operational mode or remains in the sleep mode.

24. The method according to claim 23, wherein the output of the external device is at a first logic level or a second logic level, the first logic level is greater than the second logic level.

25. The method according to claim 23, wherein the output signal of the external device is an analog value and the method comprises the step of comparing the analog value with a reference value, which may be programmable, wherein a logical result of the comparison is fed to the wake-up input of the digital processor.

26. The method according to claim 25, wherein the reference value is at a first analog valve, the first analog value is greater than the external device analog output value.

27. The method according to claim 25, wherein the reference value is at a second analog valve, the second analog value is equal to or less than the external device analog output value.

28. The method according to claim 23, wherein the power-up timer is selected from the group consisting of a general purpose timer, a real time clock and calendar (RTCC), a watchdog timer (WDT), and a deep sleep WDT.

29. The method according to claim 23, wherein the sample timer is selected from the group consisting of a general purpose timer, a real time clock and calendar (RTCC), a watchdog timer (WDT), and a deep sleep WDT.

30. The method according to claim 23, wherein the external device is selected from the group consisting of a temperature sensor, a pressure sensor, a moisture sensor, a pH sensor, a current sensor, and a voltage sensor.

31. The method according to claim 23, further comprising logically ANDing the output signal with an output from the sample timer and applying the resulting signal to the wake-up input of the digital processor.

* * * * *

UNITED STATES PATENT AND TRADEMARK OFFICE
CERTIFICATE OF CORRECTION

PATENT NO. : 8,645,729 B2  Page 1 of 1
APPLICATION NO. : 12/818547
DATED : February 4, 2014
INVENTOR(S) : Michael Simmons et al.

It is certified that error appears in the above-identified patent and that said Letters Patent is hereby corrected as shown below:

In the Claims

Columns 6-7,
Claim 8, lines 66-3, "The arrangement according to claim 1, wherein the single output line of the external device provides fo an analog signal representing an an analog sensor value and the single output line is connected to an analog input port of the microcontroller." ---Change to--- "The arrangement according to claim 1, wherein the single output line of the external device provides for an analog signal representing an analog sensor value and the single output line is connected to an analog input port of the microcontroller."

Signed and Sealed this
Twenty-second Day of April, 2014

Michelle K. Lee
*Deputy Director of the United States Patent and Trademark Office*